United States Patent [19]

Madau et al.

[11] Patent Number: 5,787,375

[45] Date of Patent: Jul. 28, 1998

[54] METHOD FOR DETERMINING STEERING POSITION OF AUTOMOTIVE STEERING MECHANISM

[75] Inventors: Dinu Petre Madau; Behrouz Ashrafi, both of Dearborn, Mich.

[73] Assignee: Ford Global Technologies, Inc., Dearborn, Mich.

[21] Appl. No.: 625,965

[22] Filed: Apr. 1, 1996

[51] Int. Cl.⁶ .................................................. B62D 5/00
[52] U.S. Cl. ........................... 701/41; 180/400; 180/443
[58] Field of Search ............................. 701/41, 42, 43; 180/400, 408–415, 421–423, 443, 446; 280/707

[56] References Cited

U.S. PATENT DOCUMENTS

| | | | |
|---|---|---|---|
| 4,722,545 | 2/1988 | Gretz et al. | 180/400 |
| 4,803,629 | 2/1989 | Noto et al. | 701/41 |
| 4,867,466 | 9/1989 | Soltis | 180/400 |
| 4,882,693 | 11/1989 | Yopp | 280/707 |
| 4,939,654 | 7/1990 | Kouda et al. | 180/400 |
| 4,961,474 | 10/1990 | Daido et al. | 701/41 |
| 4,999,776 | 3/1991 | Soltis et al. | 701/41 |
| 5,032,996 | 7/1991 | Shiraishi | 701/41 |
| 5,065,323 | 11/1991 | Shiraishi et al. | 701/41 |
| 5,253,172 | 10/1993 | Ito et al. | 180/400 |
| 5,311,432 | 5/1994 | Momose | 701/41 |
| 5,343,393 | 8/1994 | Hirano et al. | 701/41 |
| 5,422,810 | 6/1995 | Brunning et al. | 701/41 |

Primary Examiner—Gary Chin
Attorney, Agent, or Firm—Gregory P. Brown

[57] ABSTRACT

A method for determining a steering wheel angle of a vehicular steering system includes determining a center position for the steering sensor output every time the vehicle is started. The method employs the use of a yaw sensor for computing an estimate of the actual steering position so that a center position may be back computed to provide immediate and accurate steering position data using the steering sensor signal for controlling an automotive device. The accuracy of the initial estimates may be improved upon by implementing interim and final center find algorithms as vehicle operating characteristics permit.

12 Claims, 7 Drawing Sheets

METHOD FOR DETERMINING STEERING POSITION OF AUTOMOTIVE STEERING MECHANISM

BACKGROUND OF THE INVENTION

1. Field of the Invention

This invention relates to an apparatus for determining the steering position of a vehicular steering mechanism. This method is useful for controlling a vehicular braking system and other automotive devices.

2. Disclosure Information

The use of steering angle sensors to provide steering input for the control of suspension units is commonly known. Systems employing fixed steering angle sensors are prone to failure due to calibration of the sensor. Also, such sensors are unable to compensate for steering system changes, such as wheel misalignment, road crown and cross wind compensation in addition to wear within the steering mechanism.

The steering sensor system disclosed in U.S. Pat. No. 4,848,791, which is assigned to the assignee of the present invention, utilizes a software program in which steering center position is statistically determined over a fixed period of time sufficient to insure an accurate center position. While this system eliminates the calibration problems associated with fixed sensors, the system described requires significant time during initial operation to converge on a center position, thereby reducing the accuracy of the calculated instantaneous steering position.

Consequently, a greater emphasis has been placed on the ability of steering angle sensors to rapidly converge on a center position. As an example, in the application of an interactive vehicle dynamics (IVD) system, in which the brakes may be independently actuated to assist the driver's ability to turn the motor vehicle, it has been deemed important to find the actual position of the steering wheel as rapidly as possible after startup. This allows an IVD system to assist the driver to the fullest extent possible as early as possible in the operation of the vehicle. It would therefore be desirable to provide a steering angle sensor capable of reliably converging on a center position in the first seconds of vehicle motion.

It is an object of the present invention to provide a method for rapidly determining the center position of a vehicular steering mechanism each time the vehicle ignition is turned on.

SUMMARY OF THE DISCLOSURE

In accordance with the present invention, a method for determining the steering position of an automotive steering mechanism to be used for controlling an automotive device comprises the following steps:

counting steering position data from a steering angle sensor and generating a first signal therefrom representing rotational motion of the steering mechanism;

measuring a yaw rate from a yaw rate sensor and producing a second signal therefrom representing a vehicle yaw rate;

updating a straight path indicator using one of two formulas selected based on an evaluation of a predetermined group of vehicle operating characteristics;

determining a center position estimate in accordance with a predetermined algorithm when the straight path indicator exceeds a predetermined value and generating a center position signal therefrom;

estimating an actual steering wheel angle from the first signal and the center position signal and generating an estimated steering wheel angle signal therefrom; and controlling an automotive device using the estimated steering wheel angle signal.

DESCRIPTION OF THE PREFERRED EMBODIMENT

Figure 1:
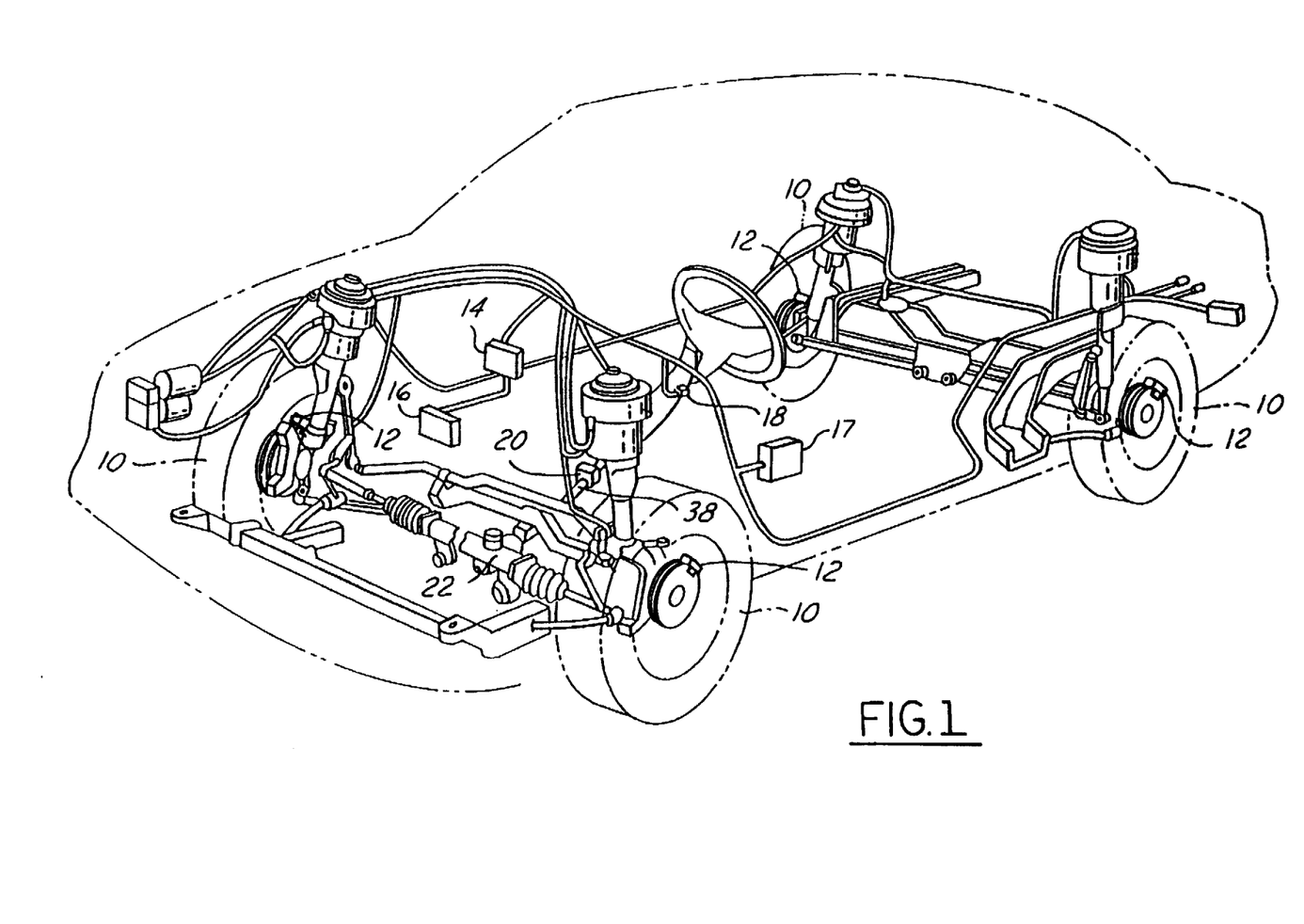
FIG. 1 is a perspective drawing of a motor vehicle including a system according to the present invention. This figure shows various components of a system embodying the present invention.

As shown in FIG. 1, a method according to the present invention is intended for use with electronically controlled hydraulic braking systems and also steering gears typically found in automotive vehicles. The motor vehicle shown in FIG. 1 is equipped with electronically controlled hydraulic braking systems having controlled brake actuators 12 which cooperate with wheel and tire assemblies 10. These brake actuators may be constructed in a known manner such as that commonly employed on Ford Motor vehicles in use today. Those skilled in the art will appreciate in view of this disclosure that a method according to the present invention could be utilized in the control of other adjustable vehicular devices such as adjustable suspension units, hydraulic crossover suspension systems, variable volume air suspension springs, or variable stabilizer bars. Similarly, system according to the present invention could be employed with semi-active and active suspension devices.

The component parts of a system which may be used with the present invention are shown in FIGS. 1–4. Accordingly, control module 14 receives inputs from steering sensor 20, speed sensor 16, yaw sensor 17 and brake sensor 18. Although not illustrated, height sensors and accelerometers could be employed with a suspension control system utilizing the present invention. A system according to the present invention could, as previously noted, be used with braking systems or other automotive equipment with which it is necessary to know the position of the steering mechanism.

Those skilled in the art will appreciate in view of this disclosure that speed sensor 16 could comprise any of a variety of devices or systems employed in automotive vehicles. One type of automotive speed sensor suitable for use with a system according to the present invention comprises a speed module for receiving input from multiple speed sensors adapted to indicate the speed of the individual wheels. The speed module derives a longitudinal vehicle speed signal by combining the signals from the speed sensors. One such type of speed signal module is embodied in brake control modules presently used in Ford Motor Company vehicles. The individual wheel speeds are ascertained using pulse generators disposed at each wheel.

Figure 4:
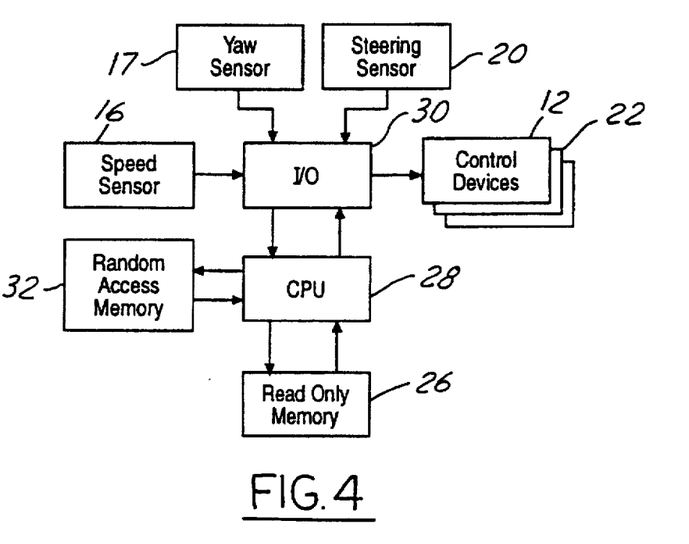
FIG. 4 is an overall system block diagram in accordance with an embodiment of this invention.

Referring to FIG. 4, a control module may output commands to brake actuators 12 (controlled devices 12, FIG. 4). Those skilled in the art will appreciate in view of this disclosure that the processor within the control module and its associated peripheral equipment could be structured according to several different architectures. In a preferred embodiment, however, the processor is configured so that a control program is sequentially read for each unit command from a read-only memory (ROM) 26 which stores preset control programs. Unit commands are executed by a central processing unit (CPU) 28. The processor integrally includes an input-output control circuit (I/O) 30 for exchanging data with external devices and a random access memory (RAM) 32 for temporarily holding data while the data are being processed.

Steering sensor 20, acting in conjunction with control module 14, includes means for measuring the excursion angle of the steering mechanism as a series of marker counts or steps measured from the initial position which the steering mechanism occupied when the system was activated by an operator keying on the ignition of the vehicle.

Figure 2:
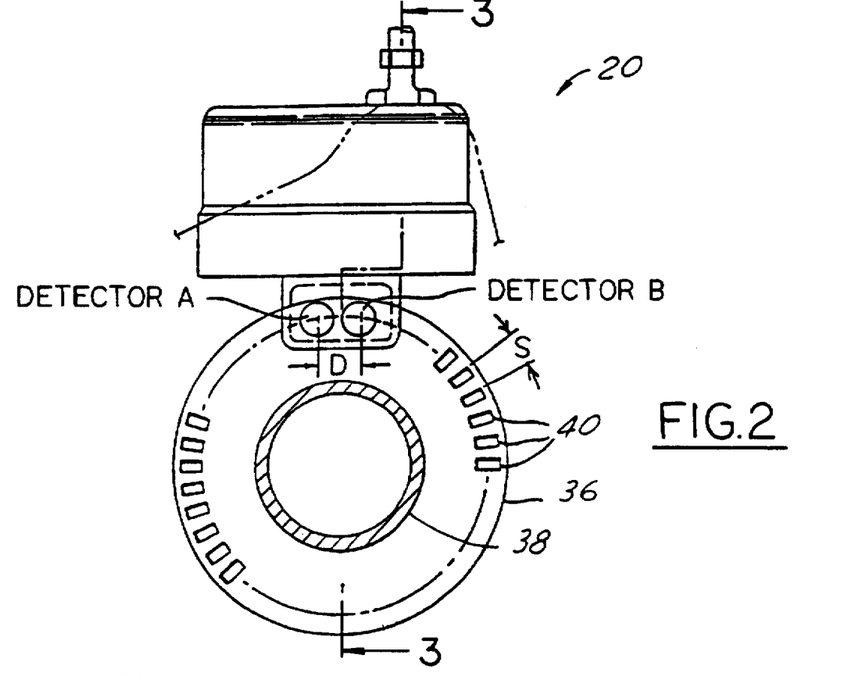
FIG. 2 is a plan view, partially cut away, of a steering sensor comprising a component part of a system according to the present invention.
Figure 3:
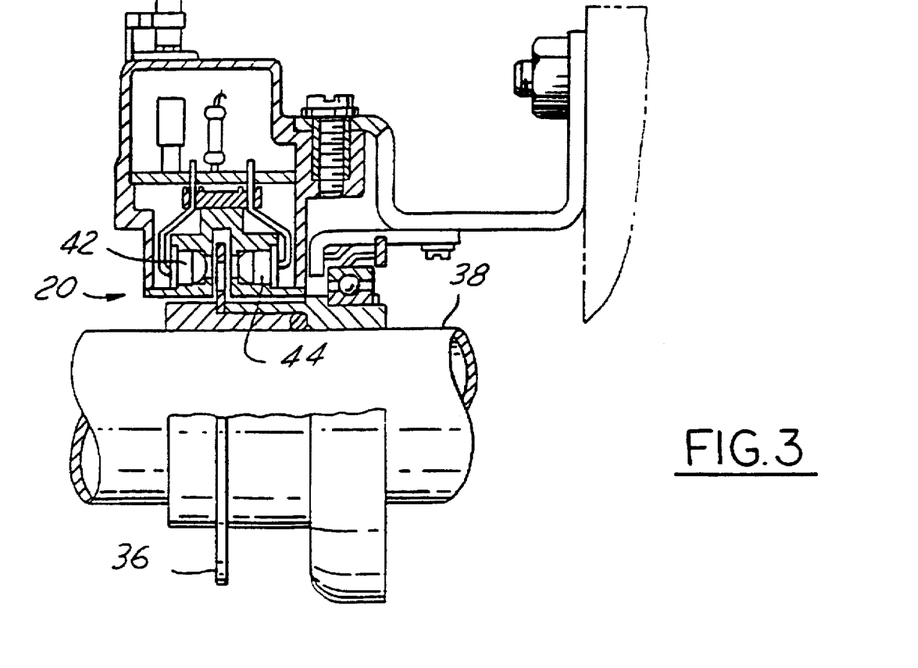
FIG. 3 is a cross sectional view of the steering sensor of the present invention taken along the line 3—3 of FIG. 2.

As shown in FIGS. 2 and 3, steering sensor 20 comprises shutter wheel 36 attached to steering shaft 38, which shaft rotates in unison with the steering wheel as the steering wheel is turned by the driver of the vehicle. Shutter wheel 36 has a plurality of apertures 40, in this case 48 in number, which apertures serve to trigger the activity of spaced apart detectors A and B as the shutter wheel is rotated with the steering system of the vehicle. Detectors A and B detect movement of the shutter wheel. Because there are 48 apertures contained within shutter wheel 36, the steering sensor provides a signal 192 times during one revolution of the steering wheel and as a result each of the 192 counts or steps indicates 1.875 degrees of rotation of the steering mechanism.

As shown in FIG. 3, each of detectors A and B includes a light emitting diode (LED) 42 and a photo diode 44. The combination of the LED and photo diode is used to detect movement of shutter wheel 36 and, hence, the steering mechanism. This is possible because the photo diodes have two states; i.e., they are bi-stable. A conducting state occurs whenever light from the paired LED passes through an aperture 40 in the shutter wheel and impinges upon the photo diode. The output of the detector circuit then rises to approximately 10 volts. A nonconducting state exists whenever the shutter wheel blocks the transmission of light between the LED and the photo diode.

Figure 5A:
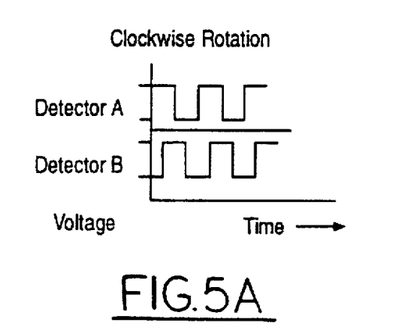
FIG. 5A illustrates the output waveforms of the detectors employed in the steering sensor illustrated in FIGS. 2 and 3 for clockwise rotation.
Figure 5B:
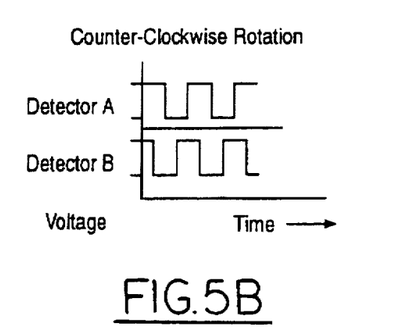
FIG. 5B illustrates the output waveforms of the detectors employed in the steering sensor illustrated in FIGS. 2 and 3 for counterclockwise rotation.

As shown in FIG. 5A, clockwise rotation of shutter wheel 36 produces a waveform pattern for the detectors in which detector A undergoes its transition prior to detector B. In other words, detector A leads detector B. This results from the spacing between the detectors, shown as dimension D in FIG. 2 with respect to the spacing between the apertures shown as dimension S in FIG. 2. More precisely, dimension D is 1.75 times dimension S. As shown in FIG. 5B, counterclockwise rotation of the steering sensor produces a waveform pattern for the detectors in which detector A undergoes its transition after detector B and detector A thus lags detector B. The outputs of detectors A and B are fed into the control module, and in this manner the control module is allowed to track the direction of the steering mechanism's movement. Increasing the number of apertures on shutter wheel 36 improves the resolution of the sensor. The present invention allows a significant increase in the number of apertures while maintaining the ability to reject meaningless steering wheel excursions (by determining a finer resolution).

Figure 6:
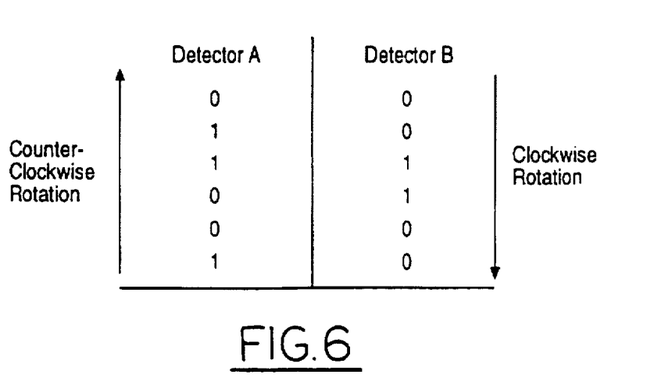
FIG. 6 is a truth table illustrating the outputs of detectors A and B shown in FIGS. 2–3 as the steering sensor of the present invention is rotated counterclockwise and clockwise.

FIG. 6 is a tabulation of the waveforms shown in FIGS. 5A and 5B in a digital format. In conventional fashion, the approximately 10 volts maximum output of the detectors is treated as a logical "1", while the zero output state is treated as a logical "O". FIG. 6 shows each of the possible logic pair states which could be output by detectors A and B. The pairs are arranged in the order in which they will be received by the control module for both counterclockwise and clockwise rotation. As seen in FIG. 6, counterclockwise rotation is read from the bottom of the figure to the upper part of the figure with clockwise rotation being read from the top of the tabulation to the lower part of the tabulation. Thus, it may be realized that detector devices A and B generate a cyclical series of two-bit, binary coded data (SWA), corresponding to a finite amount of rotation of steering shaft 38 relative to the initial position of the steering mechanism at startup. The use of these counts to determine an accurate estimate of the actual center position of the steering mechanism (SWACENTER) and a corresponding estimate of the actual steering angle (SWAEST) of the vehicle in a system according to the present invention will be explained in conjunction with FIGS. 7A, 7B and 7C.

Generally, the present invention provides an improvement in determining the estimated center position necessary for calculating the steering position from the raw steering data (SWA) obtained from the steering sensor 20. It should be recognized that the difference between the measured steering data (SWA) and the actual steering angle is the difference between the actual steering wheel angle at vehicle start up and the steering wheel angle when traveling straight ahead (ideally zero.) Unfortunately, it cannot be guaranteed that a vehicle will always be started with the steering mechanism in the straight ahead position. Therefore, it becomes necessary to estimate the location of the center position.

The present invention determines the location of the center position according to one of three techniques, an initial center algorithm, an interim center algorithm and a final center algorithm. The primary difference among the algorithms is the speed with which they converge on a center position estimate and the accuracy or reliability of this center position estimate. Initially, when the operator first starts the vehicle, the initial center algorithm is used to provide a very rapid estimate of the center position. Then, when predetermined vehicle operating characteristics are satisfied, the processor switches over and uses the interim center algorithm. In the preferred embodiment, the processor makes this switch when it senses the steering mechanism is substantially positioned in the estimated center position. Once the switch has been made, the processor will not return to the initial center algorithm until the ignition is switched from off to on.

The processor will refine the estimate of the center position using the interim center algorithm until further operating characteristics are satisfied. When these characteristics are satisfied, the processor switches to the final center algorithm for providing the final adjustments to the center position estimate. Similarly, the processor will not exit the final center algorithm until the ignition is switched off. The operation of these three center position estimating algorithms and how they are integrated into a system will be described below.

Figure 7A:
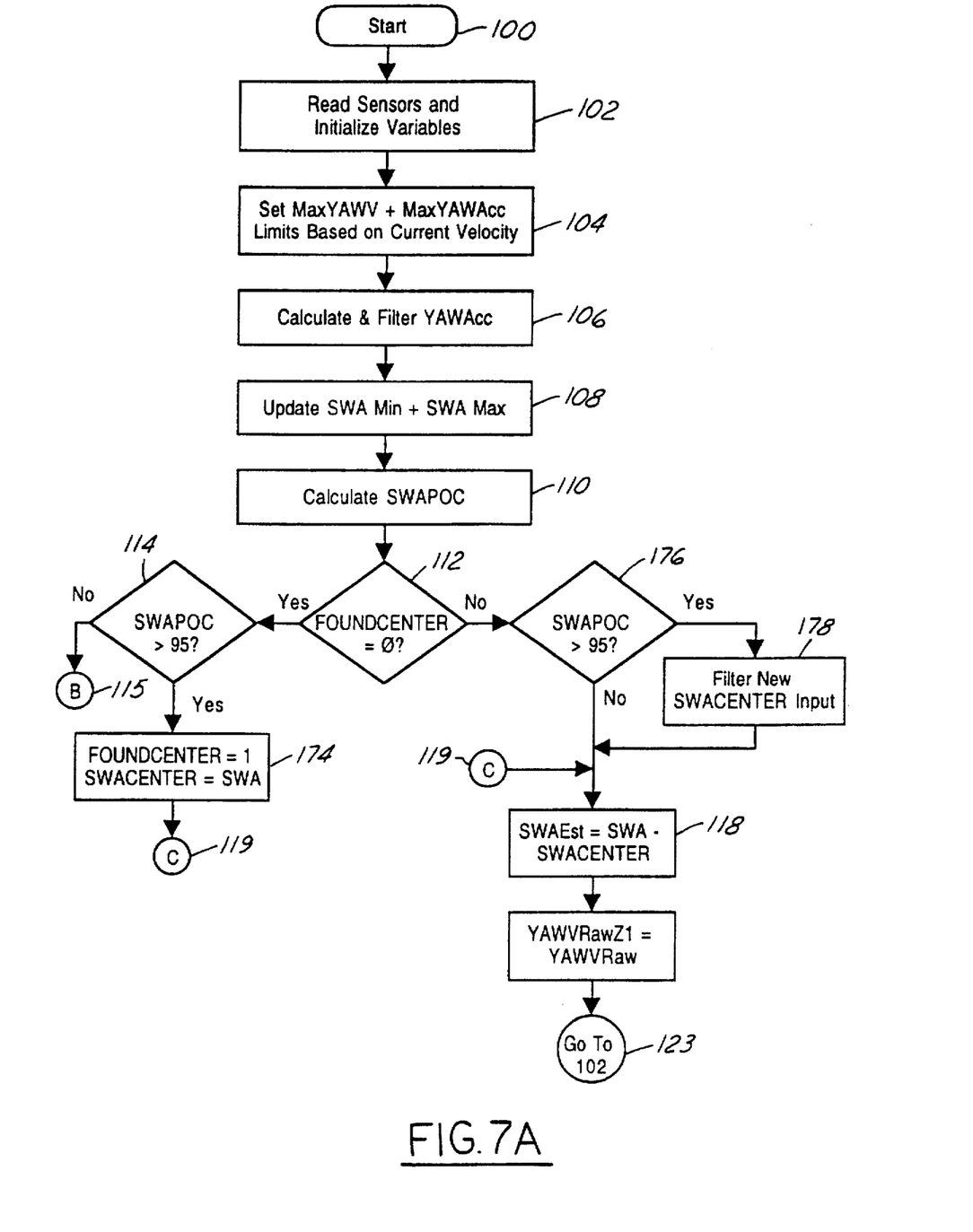
FIGS. 7A, 7B and 7C are logic flow block diagrams in accordance with the principles of the present invention.

Turning now to FIG. 7A, operation of a system in accordance with the present invention will be further explained. At block 100 the processor starts the illustrated algorithm when the operator keys on the vehicle ignition. The processor then moves to block 102 where the various sensors are read and their data input to the processor. If this is the first time through the algorithm all of the variables are initialized with predetermined values. The processor then steps to block 104 where maximum yaw velocity and acceleration limits (MaxYawV, MaxYawAcc) are set depending on the vehicle longitudinal speed read at block 102. The processor then proceeds to block 106 and calculates the yaw acceleration (YawAcc) and other variables from the yaw rate data read at block 102. The processor then advances to block 108.

At block 108, the processor updates minimum and maximum steering wheel angles (SWAMIN, SWAMAX) experienced thus far by comparing their present values with the present steering wheel angle data (SWA). The processor then advances to block 110 and calculates a quantitative straight path indicator (SWAPOC) of the likelihood that the vehicle is traveling in a straight line. SWAPOC ranges from 0 to 100, with 100 indicating a strong likelihood that the vehicle is traveling straight. In the presently preferred embodiment SWAPOC is calculated according to one of two formulas. First, the operating characteristics of the motor vehicle are assessed to determine which of two formulas to use to update SWAPOC. If the longitudinal velocity of the vehicle is greater than a predetermined velocity, which in the presently preferred embodiment is 7 kph, and a flag representing the status of an IVD system indicates that the IVD system is not active and absolute values of the yaw velocity and acceleration are less than predetermined limits, MaxYawV and MaxYawAcc, respectively, a first formula will be used. If these conditions are satisfied, the processor uses the first relationship to increase the value for SWAPOC, indicating that the vehicle is likely operating in a straight path. The assumption is that if the vehicle operates under these conditions long enough, then the vehicle is traveling straight. If, on the other hand, these conditions are not satisfied, then the processor uses a second relationship to decrease SWAPOC. In the presently preferred embodiment, the first relationship takes the following form:

SWAPOC=20+SWAPOC*0.80 and the second relationship takes the following form:

SWAPOC=SWAPOC*.80

The processor then proceeds to conditional block 112.

At conditional block 112, the processor ascertains whether or not the final center routine has been started by checking the status of a flag, FOUNDCENTER. At the outset, the FOUNDCENTER flag will be false, or 0, and the processor will proceed to conditional block 114. At conditional block 114 the processor evaluates the indicator SWAPOC to determine whether or not SWAPOC has attained a value greater than 95. Similarly, at the outset SWAPOC will be less than 95 and the processor will proceed through advance block 115 to block 116.

Referring now to FIG. 7A, the processor evaluates several vehicle conditions at the conditional block 116 to determine whether or not the vehicle is operating in a state for which a center position should be estimated. In the presently preferred embodiment, this conditional block is satisfied by the existence of the following conditions: the ignition has been switched on long enough for the yaw sensor to power-up and stabilize; the vehicle is traveling at less than a predetermined minimum, which in the present invention is 7 kph; and the IVD system is inactive. If any one of these conditions is not satisfied the processor forgoes updating the center position and proceeds via advance block 119 to block 118.

Referring back to FIG. 7A, at block 118 the processor uses the existing estimate of SWACENTER to determine the estimate of the steering angle, SWAEST according to the following relationship:

SWAEST=SWA−SWACENTER where SWA is the uncentered signal generated by the steering wheel angle sensor. On the first pass through, if the conditions in block 116 were not satisfied, SWAEST would assume a value equal to SWA since SWACENTER would still have its initialized value of 0. The processor then proceeds to block 122 where the present value of the yaw rate signal, YawVRaw, is stored in memory as YawVRawZ1 for use in first order filtering devices. The processor then proceeds to block 102 via advance block 123.

Figure 7B:
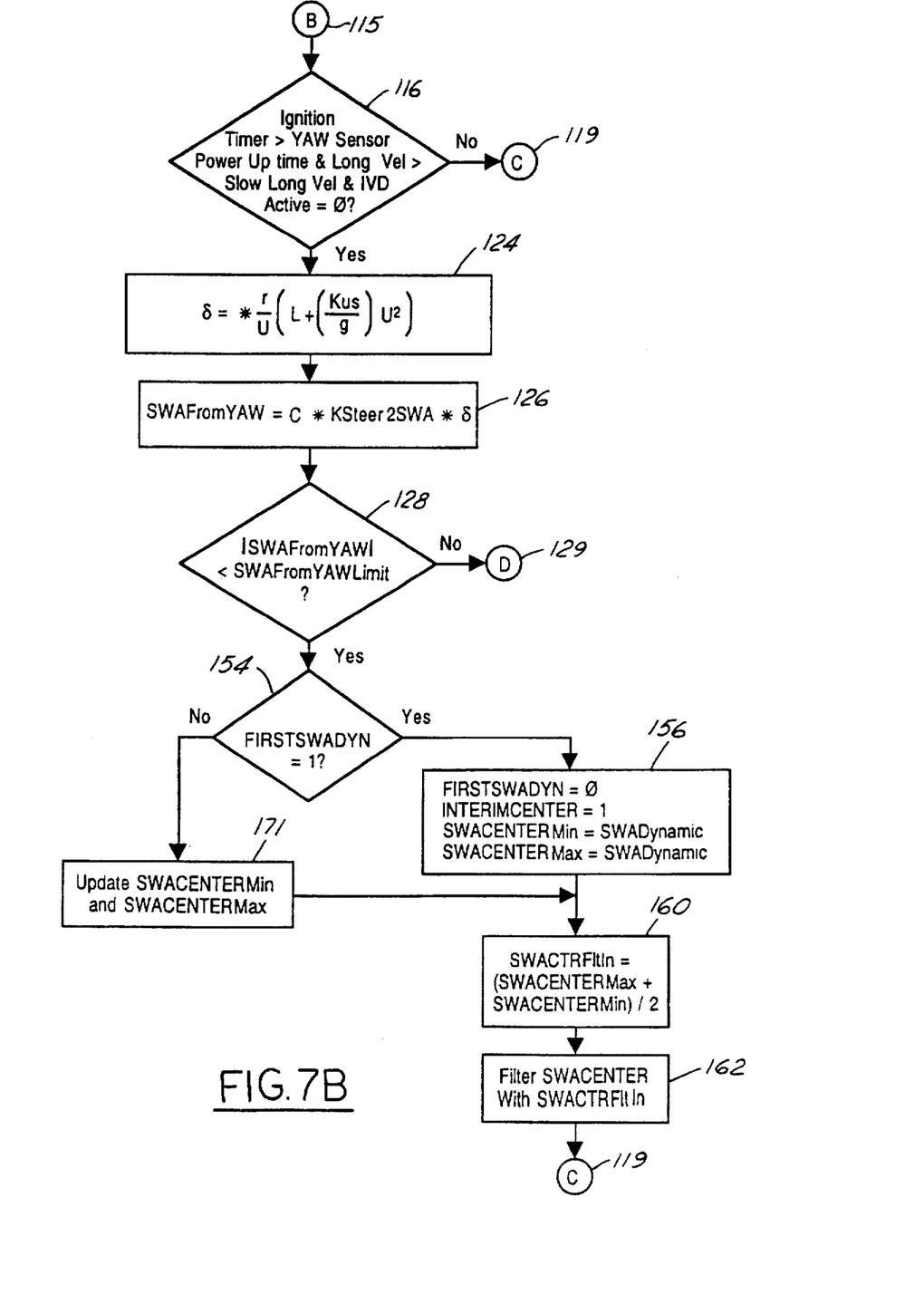

At block 102 the sensors are read and the variables are updated based on the new data. The processor proceeds through blocks 104, 106, 108 and 110 as previously described. At conditional block 112, assume FOUNDCENTER remains "false" and the processor proceeds to block 114. Also assume that SWAPOC has not yet exceeded a value of 95. Referring now to FIG. 7B, the processor proceeds via advance block 115 to conditional block 116, where the processor will once again assess the operating characteristics of the vehicle. Assume this time the characteristics described above are satisfied and the processor proceeds to block 124.

At block 124, the processor calculates the steering angle of the front tires according to the following relationship:

$$\delta = \frac{r}{U}\left(L + \frac{K_{us}}{g}U^2\right)$$

where:

δ=the steered angle of the steerable tires;
r=the yaw rate of the vehicle;
U=the longitudinal velocity of the motor vehicle;
L=the distance from the front axle to the rear axle;
Kus=the understeer coefficient for the steered wheel suspension;
g=gravitational constant.

Knowing the steered angle of the tires, δ, the processor can compute a yaw measurement based steering wheel angle, SWAFromYAW. At block 126 the processor calculates SWAFromYAW according to the following relationship:

SWAFromYAW=C*KSteer2SWA*δ where:

SWAFromYAW=the steering wheel angle computed from yaw measurement data;
C=conversion constant from radians to degrees;

KSteer2SWA=steering ratio, a constant dependent on the steering mechanism and steering geometry.

It should be noted that in the preferred embodiment it has been found advantageous to provide unique steering ratio constants for right hand turns versus left hand turns, of varying magnitude specifically for vehicles having nonsymmetric steering mechanisms or geometry. With this information the processor proceeds to conditional block 128.

At conditional block 128, the processor determines whether the absolute value of SWAFromYAW is less than a predetermined limit, SWAFromYAWlimit. This predetermined limit represents boundaries within which a steering angle would be considered to represent straight line travel. For instance, the predetermined limit could be set to 5 degrees. If the absolute value of SWAFromYAW is less than 5 degrees, then the processor will assume the vehicle is going straight or transitioning through the straight line steer position. The first time this occurs is referred to an "initial crossing". A crossing refers to the crossing from a non-zero steering position into a boundary representative of substantially straight ahead driving, or zero steering angle. The crossing may also be referred to as a zero crossing. Assuming that the absolute value SWAFromYAW is greater than SWAFromYAWlimit, the processor proceeds to block 132 via advance block 129.

Figure 7C:
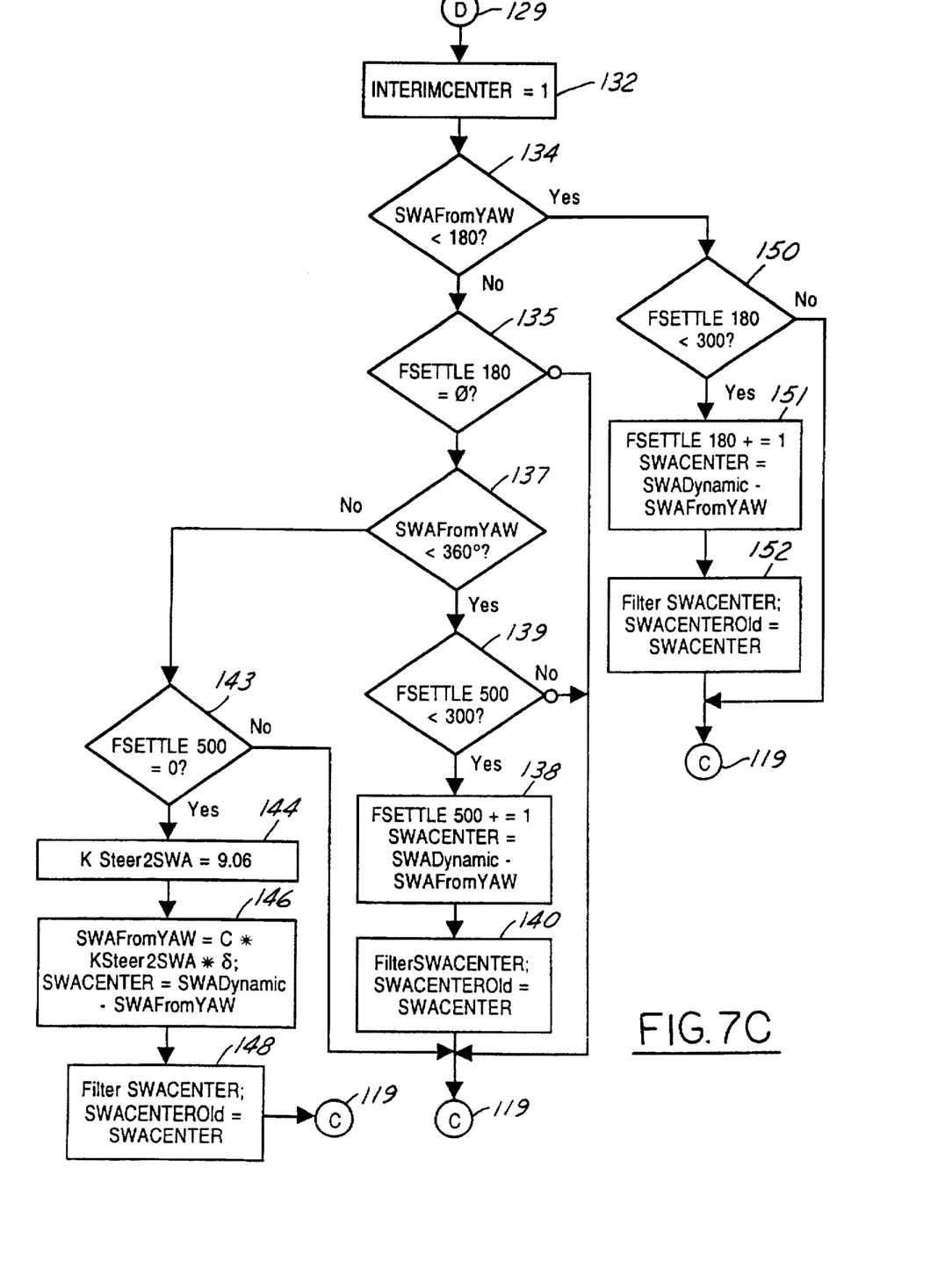

Referring now to FIG. 7C, the processor sets the initial center flag, INITIALCENTER, equal to "true" or "1" at block 132 to indicate that the processor has started the initial center algorithm. The initial center algorithm first determines if the present steering event is greater than a predetermined minimum. It has been observed that SWACENTER values calculated when steering wheel angles are less than 180 degrees are more accurate than values calculated when the steering wheel angles are greater than 180 degrees. Therefore, it is advantageous to use data taken during steering events having steering wheel angles less than 180 degrees. The present embodiment of the initial center algorithm benefits from this observation.

At conditional block 134 the processor evaluates the steering angle calculated from the yaw data, SWAFromYAW, to determine whether it is less than 180 degrees. Assuming SWAFromYAW is not less than 180 degrees, the processor proceeds to conditional block 135. There, the processor checks a counter, FSETTLE180, to determine whether the processor has calculated SWACENTER using SWAFromYAW data of less than 180 degrees. If FSETTLE180 is greater than zero, the processor skips to block 118 via advance block 119 where SWAEST is updated using the existing SWACENTER value. This prevents the processor from recalculating SWACENTER if it has been calculated using SWAFromYAW data of less than 180 degrees. If FSETTLE180 is equal to 0, then the processor continues to conditional block 137.

At block 137, the processor determines whether SWAFromYAW is less than 360 degrees. This is necessary because it has been determined in practice that for very large steering angles, a more accurate SWACENTER can be obtained if a unique value is used for the steering ratio, KSteer2SWA. Assuming SWAFromYAW is not less than 360 degrees, the processor will proceed to conditional block 143. There, the processor checks another counter, FSETTLE500, which counts the number of times the initial center algorithm calculates SWACENTER when SWAFromYAW is greater than or equal to 180 degrees, but less than 360 degrees. Here, SWACENTER will only be calculated if FSETTLE500 is equal to zero, indicating that SWACENTER has not been calculated using data less than 360 degrees. Once FSETTLE500 is greater than zero, SWACENTER will not be calculated using data greater than 360 degrees. Assuming FSETTLE500 is equal to zero, the processor proceeds to block 144. At block 144 KSteer2SWA is reset and the processor calculates a new SWAFromYAW and corresponding SWACENTER at block 146. SWACENTER is calculated according to the following relationship:

$$SWACENTER = SWADynamic - SWAFromYAW$$

where SWADynamic represents the SWA signal from the steering angle sensor after it has been passed through a second order filter. At block 148 SWACENTER is filtered by a first order filter and SWACENTERold is set to equal the new filtered SWACENTER. At this point the processor proceeds to block 118 via advance block 119. The processor then proceeds to calculate SWAEST and return back through the loop to ultimately end up in the initial center routine again, assuming that SWAPOC had not exceeded 95 or SWAFromYAW had not fallen below SWAFromYAWlimit.

Assuming this time that SWAFromYAW is between 180 degrees and 360 degrees and FSETTLE180 equals zero, the processor proceeds to conditional block 139. At block 139, if FSETTLE500 is greater than 300 the processor would proceed to block 118 via advance block 119, indicating that no additional calculations need be made using this range of data. If FSETTLE500 is less than 300, the processor proceeds to block 138, where FSETTLE500 is incremented and SWACENTER is calculated according to the following relationship:

$$SWACENTER = SWADynamic - SWAFromYAW$$

where the variables are the same as those discussed in reference to block 146. At block 140 the processor filters the SWACENTER signal through a first order filter and updates SWACENTERold with the new SWACENTER value. The processor then proceeds to block 118 via advance block 119 where SWAEST is updated using the new SWACENTER value. Assuming that SWAPOC had not exceeded 95 or SWAFromYAW had not fallen below SWAFromYAWlimit, the processor returns to the initial center algorithm.

Now, assume that SWAFromYAW is less than 180 degrees. The processor proceeds to conditional block 150 to evaluate FSETTLE180, to determine if it is below a predetermined limit. This counter serves two purposes. First, once the initial center algorithm makes its first center position estimate using data acquired with SWAFromYAW less than 180 degrees, the processor increments the counter and the routine will not recalculate SWACENTER when SWAFromYAW is greater than or equal to 180 degrees. The second purpose eliminates redundant computation. It has been observed that the SWACENTER does not improve after a predetermined number of calculations, that is to say it converges within the limits of accuracy of the initial center algorithm. In the presently preferred embodiment, this corresponds to 300 iterations. If FSETTLE180 is greater than 300, the processor proceeds directly to block 118 via advance block 119 preventing any further updating of SWACENTER by the initial center algorithm. If FSETTLE180 is less than 300, the processor proceeds to block 151, where FSETTLE180 is incremented and SWACENTER is calculated according to the following relationship:

$$SWACENTER = SWADynamic - SWAFromYAW$$

where the variables are the same as those discussed in reference to block 146. At block 152 the processor filters SWACENTER signal through a first order filter and updates SWACENTERold with the new SWACENTER value. The processor then proceeds to block 118 via advance block 119 where SWAEST is updated using the new SWACENTER value. The processor will continue in the initial center algorithm until SWAPOC becomes greater than 95 or the SWAFromYAW becomes less than the SWAFromYAWlimit at block 128.

Referring back now to FIG.>7B, assuming SWAPOC has not attained a value of 95, the interim center algorithm is initially entered at block 154 when the absolute value of SWAFromYAW becomes less than the SWAFromYAWlimit as tested at conditional block 128. It should be noted that additional criteria ma be used to determine the stability of the zero crossing. For instance, it may be advantageous to determine the frequency of zero crossings. If the frequency exceeds a threshold, the zero crossing data may be rejected. If these conditions are satisfied, then this corresponds to the initial center crossing. At conditional block 154, the processor checks a flag, FIRSTSWADYN, to determine if this is the initial center crossing. If FIRSTSWADYN is "true" or "1", then this pass represents the initial center crossing and the processor proceeds to block 156. At block 156, the processor sets the flag, FIRSTSWADYN, to "false" or "0", indicating that subsequent center crossings will not be the initial center crossing. The processor also sets another flag, INTERIMCENTER, to "1" to indicate that the interim center algorithm has been entered, which will prevent the processor from returning to the initial center algorithm. The processor then sets SWACENTERMIN and SWACENTERMAX to the current value of SWADYNAMIC. At this point SWADYNAMIC represents the best estimate of SWACENTER and therefore it is also the most accurate boundaries for future SWACENTER filtering.

The processor then proceeds to block 160 where a variable, SWACTRFLTIN, for use in a first order filter, is calculated according to the following relationship:

$$SWACTRFLTIN = \frac{SWACENTERMAX + SWACENTERMIN}{2}$$

The variable SWACTRFLTIN enables the use of a dynamic first order filter, which, in essence ensures that the filtered SWACENTER signal falls between the boundaries of SWACENTERMIN and SWACENTERMAX. This filtering occurs at block 162. The processor then proceeds to block 118 via advance block 119.

The processor will continue to determine and refine SWACENTER using the interim center algorithm as long as SWAPOC is less than 95 and the final center algorithm has not been entered. It should be noted that the interim center algorithm updates SWACENTER only when the system is involved in a zero crossing, as determined at block 128. Otherwise, the processor proceeds using the previously determined SWACENTER via advance block 129. Assuming the absolute value SWAFromYAW is less than SWAFromYAWlimit at block 128, the processor proceeds from conditional block 154 to block 171 where SWACENTERMIN and SWACENTERMAX are updated using the present values of SWADYNAMIC, but only if they provide a tighter set of boundaries than the previous SWACENTERMIN and SWACENTERMAX. The processor then proceeds through block 160 as described above. It should be noted that it may be desirable to incorporate a delay loop in the interim center algorithm to eliminate redundant computations while the steering system is operated within a single zero crossing event. The interim center algorithm is repeated until SWAPOC at logic block 114 exceeds 95.

Referring now to FIG. 7A, assuming that SWAPOC is greater than 95, the processor will be directed to block 174 by block 114. At block 174 the final center algorithm flag, FOUNDCENTER, will be set "true" or "1", indicating that the final center algorithm has been entered. The processor will not return to the interim center algorithm until after the ignition key is turned off and then on. The processor also sets SWACENTER equal to the current reading of SWA. As SWAPOC is now greater than 95, the assumption is that the vehicle is traveling along a straight path. The processor is then directed via advance block 119 to block 118 where SWAEST will be once again determined in the usual fashion. The processor will once again return to logic block 112 where the FOUNDCENTER flag will indicate that the final center algorithm has been initiated and the processor will be directed to logic block 176. At block 176, the processor determines if SWAPOC is greater than 95. In the event SWAPOC is greater than 95 the processor will proceed to block 178 where SWACENTER is filtered with the current SWA by a first order filter using the previous SWACENTER data. If SWAPOC is less than 95, the processor proceeds to block 118 and calculates SWAEST using the existing value of SWACENTER and the current SWA.

Figure 8:
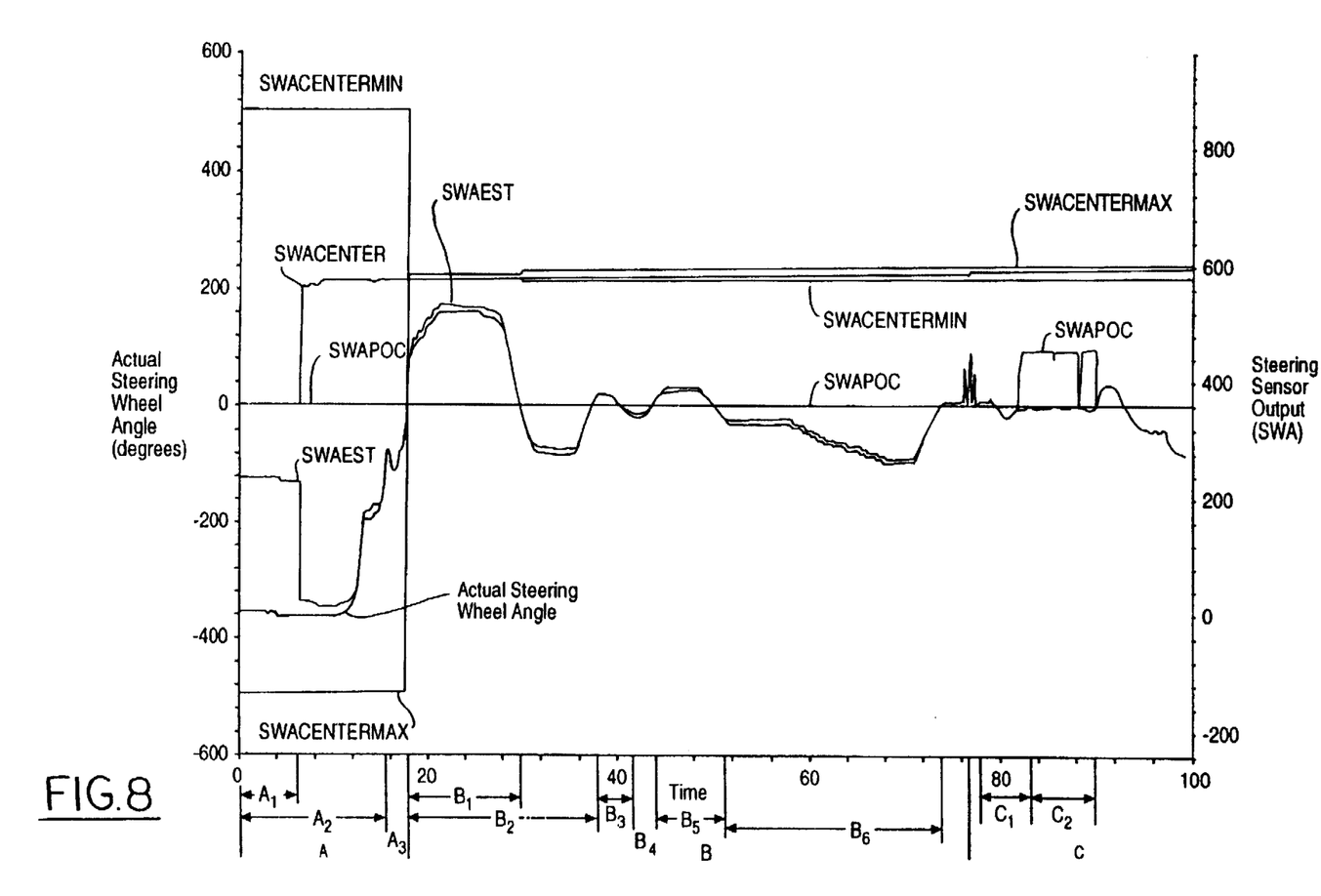
FIG. 8 shows a time based plot of some variables generated during the execution of algorithms in accordance with the principles of the present invention.

Referring now to FIG. 8, a plot illustrates values of the several variables as the processor proceeds through each of the three algorithms described above. It should be noted that the scenario depicted is for illustrative purposes and does not reflect actual performance of the present invention as one would anticipate under normal driving conditions. However, the plot does illustrate the rapid convergence and unparalleled accuracy for a sample worst case scenario. Generally, convergence will occur almost simultaneously with the vehicle attaining 7 kph. The ordinate on the left of the plot indicates the actual steering wheel angle, which is what the invention is trying to determine. The ordinate on the right indicates the signal generated by the steering wheel sensor, SWA. It should be noted that the challenge arises from having a non-calibrated signal, SWA, generated by the steering wheel sensor. That is, every time the vehicle is keyed on, the sensor indicates a zero value output for the present steering position. This must be calibrated by a process such as the present invention to obtain the actual steering wheel angle as inidcated by the left ordinate.

The initial portion, identified as "A" along the time axis, refers to the initial center algorithm. It can be seen that, initially, the steering wheel angle exceeds 360 degrees. By the end of $A_1$, the system has calculated a value for SWACENTER. This means the system has an estimate for controlling the vehicle dynamics shortly after keying the ignition on. The most significant delay represents the time the vehicle took to get to 7 kph.

As the steering wheel angle drops below 180, as indicated during $A_2$, the processor recalculates and reconverges SWACENTER, as can be seen by the slight "ripple" in the SWACENTER plot. During $A_3$ the steering system encounters the first center crossing. This triggers the interim center algorithm, shown as portion B along the time axis. The processor adjusts SWACENTERMIN and SWACENTERMAX from their initialized values. These values are maintained until the start of $B_2$, where the next crossing occurs. As can be seen, at each crossing $B_1$, $B_2$, $B_3$, etc. minor refinements in SWACENTERMIN and SWACENTERMAX are made, resulting in small changes in the filter through which SWACENTER is processed. Ultimately, SWAPOC reaches a value exceeding 95 and the processor enters the final center algorithm. Due to the scale of the drawing, SWAPOC appears to be a step function, however it is actually gradually built up through successive iterations by the processor. At the very beginning of portion C, SWACENTER is set equal to SWA, which appears in the present example to be approximately 360 degrees. Subsequently, SWAPOC drops below 95 for a period, $C_1$. The processor does not update SWACENTER again until SWAPOC exceeds 95, which occurs several times during period $C_2$. The processor continues in the final center algorithm until the vehicle ignition is keyed off.

Various modifications and variations will no doubt occur to those skilled in the art to which this invention pertains. For example, the particular sensors used in conjunction with the disclosed system may be varied from those herein and the system may be operated according to various control constants and with other values for the variables contained within the calculational scheme described herein. These and all other variations which basically rely on the teachings by which this disclosure has advanced the art are properly considered within the scope of this invention as defined by the appended claims.

We claim:

1. A method for determining a steering wheel angle of an automotive steering mechanism and controlling an automotive device, comprising the steps of:

counting steering position data from a steering angle sensor and generating a first signal therefrom representing rotational motion of the steering mechanism;

measuring a yaw rate from a yaw rate sensor and producing a second signal therefrom representing a vehicle yaw rate;

updating a straight path indicator using one of two formulas selected based on an evaluation of a predetermined group of vehicle operating characteristics, including said vehicle yaw rate;

determining a center position estimate in accordance with a predetermined algorithm when said updated straight path indicator exceeds a predetermined value and generating a center position signal therefrom;

estimating an actual steering wheel angle from said first signal and said center position signal and generating an estimated steering wheel angle signal therefrom; and controlling the automotive device using said steering wheel angle signal.

2. A method according to claim 1, further comprising the step of calculating a vehicle yaw acceleration from said second signal.

3. A method according to claim 2, wherein said vehicle operating characteristics include vehicle longitudinal velocity.

4. A method according to claim 1, wherein said step of updating a straight path indicator further comprises the following steps:

reducing said straight path indicator when any one of said vehicle operating characteristics does not exceed a predetermined minimum; and increasing said straight path indicator when all said vehicle operating characteristics equal or exceed said predetermined minimum.

5. A method according to claim 1, whereby said step of generating an estimated steering wheel angle signal includes evaluating the following relationship:

$$SWAEST = SWA - SWACENTER$$

where:

SWAEST=estimated steering wheel angle;

SWA=the signal generated by the steering wheel angle sensor;

SWACENTER=calculated center position.

6. A method according to claim 1, wherein said step of determining a center position estimate in accordance with a predetermined algorithm further comprises only updating said center position signal when said straight path indicator exceeds a predetermined value once said predetermined value has been exceeded a first time.

7. A method for determining a steering wheel angle of an automotive steering mechanism and controlling an automotive device, comprising the steps of:

counting steering position data from a steering angle sensor and generating a first signal therefrom representing rotational motion of the steering mechanism;

measuring a yaw rate from a yaw rate sensor and producing a second signal therefrom representing a vehicle yaw rate;

calculating a vehicle yaw acceleration from said second signal;

updating a straight path indicator using one of two formulas selected based on an evaluation of a predetermined group of vehicle operating characteristics, including said vehicle yaw rate and said vehicle yaw acceleration;

determining a center position estimate in accordance with a predetermined algorithm when said updated straight path indicator exceeds a predetermined value and generating a center position signal therefrom;

estimating an actual steering wheel angle from said first signal and said center position signal and generating an estimated steering wheel angle signal therefrom; and controlling the automotive device using said steering wheel angle signal.

8. A method according to claim 7, wherein said vehicle operating characteristics include vehicle longitudinal velocity.

9. A method according to claim 7, wherein said step of updating a straight path indicator further comprises the following steps:

reducing said straight path indicator when any one of said vehicle operating characteristics does not exceed a predetermined minimum; and increasing said straight path indicator when all said vehicle operating characteristics equal or exceed said predetermined minimum.

10. A method according to claim 7, whereby said step of generating an estimated steering wheel angle signal includes evaluating the following relationship:

$$SWAEST = SWA - SWACENTER$$

where:

SWAEST=estimated steering wheel angle;

SWA=the signal generated by the steering wheel angle sensor;

SWACENTER=calculated center position.

11. A method according to claim 7, wherein said step of determining a center position estimate in accordance with a predetermined algorithm further comprises only updating said center position signal when said straight path indicator exceeds a predetermined value once said predetermined value has been exceeded a first time.

12. A method for determining a steering wheel angle of an automotive steering mechanism and controlling an automotive device, comprising the steps of:

counting steering position data from a steering angle sensor and generating a first signal therefrom representing rotational motion of the steering mechanism;

measuring a yaw rate from a yaw rate sensor and producing a second signal therefrom representing a vehicle yaw rate;

updating a straight path indicator using one of two formulas selected based on an evaluation of a predetermined group of vehicle operating characteristics, including said vehicle yaw rate;

determining a center position estimate in accordance with a predetermined algorithm when said updated straight path indicator exceeds a predetermined value and generating a center position signal only when said straight path indicator exceeds said predetermined value;

estimating an actual steering wheel angle from said first signal and said center position signal and generating an estimated steering wheel angle signal therefrom; and controlling the automotive device using said steering wheel angle signal.

* * * * *